United States Patent [19]

Sodini et al.

[11] 4,072,671

[45] Feb. 7, 1978

[54] METHOD FOR EXTRACTING PHENOLS AND OLIGOSACCHARIDES FROM VEGETABLE TISSUES

[75] Inventors: Giancarlo Sodini; Marco Canella, both of Rome, Italy

[73] Assignee: Snamprogetti, S.p.A., San Donato Milanese, Italy

[21] Appl. No.: 659,749

[22] Filed: Feb. 20, 1976

[30] Foreign Application Priority Data

Jan. 14, 1976 Italy .................................. 19240/76
Feb. 21, 1975 Italy .................................. 20504/75

[51] Int. Cl.$^2$ .......................... A23J 3/00; A23L 1/20; A23L 1/36
[52] U.S. Cl. ................................ 260/123.5; 426/629; 426/634; 426/656; 426/430
[58] Field of Search ............... 426/629, 634, 656, 430, 426/489, 425; 260/112 R, 123.5

[56] References Cited

U.S. PATENT DOCUMENTS

| 3,168,406 | 2/1965 | Moshy | 426/634 X |
| 3,365,440 | 1/1968 | Circle et al. | 426/430 X |
| 3,895,003 | 7/1975 | Swain et al. | 426/430 X |

*Primary Examiner*—Raymond N. Jones
*Assistant Examiner*—R. A. Yoncoskie
*Attorney, Agent, or Firm*—Morgan, Finnegan, Pine, Foley & Lee

[57] ABSTRACT

A method for stripping phenols and fermentable oligosaccharides from vegetable materials is disclosed, which consists in using a mixed solvent composed of a polar organic solvent formed by an alcohol, a ketone or an ester combined with an aqueous solution of an acidic electrolyte, the electrolyte is preferably an organic or inorganic acid or an acidic salt of these. The extraction temperature is from 4° C to the temperature which is safe enough as not to experience protein denaturation. Certain critical ranges for the pH and solute to solvent ratios are also indicated.

10 Claims, No Drawings

METHOD FOR EXTRACTING PHENOLS AND OLIGOSACCHARIDES FROM VEGETABLE TISSUES

This invention relates to a method for extracting phenols and oligosaccharides from vegetable tissues to obtain proteic concentrates and isolates having low contents of antinutritional factors and chromogenic compounds.

It is known [see Loomis, W. D., and Battaile, J. Phytochemistry, 5,423 (1966) and Pierpoint, W. S., Biochem. J., 112, 609 (1969)] that in the vegetable kingdom phenolic and polyphenolic compounds are widespread and are found in the free form or bound to proteinic and glucidic constituents as present in different parts of the plants, but mainly in the seeds, leaves, stalks and roots. These natural substances have the property of being oxidized to quinones, and these, in their turn, become quickly polymerized in alkaline environments and react with the proteins to form covalent and hydrogen bonds.

The oxidation of phenols to quinones takes place in the presence of oxygen, or also by the agency of a few enzymes such as phenoloxidase, peroxidase and others.

The use of proteins extracted from vegetables for human feeding is strongly hindered by the presence of phenolic constituents for the following reasons of an economic and nutritional nature:

the formation of covalent bonds between the phenols and a few essential aminoacids which are present in the isolates decreases their nutritional value inasmuch as the novel condensation compounds formed in this way cannot be metabolyzed by human beings: thus such phenolic substances, if they are not removed, are antinutritional factors.

the quick oxidation of such compounds imparts, according to the pH a green-brown discoloration to the proteins, making the latter often unacceptable as a food.

the presence of the phenolic constituents decreases the capability of the proteins to be extracted due to their interactions with the proteins themselves.

a few phenols have a toxic nature, such as for example gossypol, a phenol bialdehyde which is present in cotton seeds.

The methods which have been disclosed heretofore for removing such compounds from vegetable flours are unsatisfactory since they do not allow an extraction which is sufficient to secure the preparation of colorless extracts [Smith, A. K., and Johnsen, V. L. Ceral. Chem. 25, 399 (1948) and Pomenta, J. V. and Burns, E. P., J. Food Sci., 36, 490 (1971)], or they do cause a more or less pronounced denaturation of the proteins [Joubert, F. J., Biochem. Biophys. Acta, 16, 520 (1955); Gheyasudding, S., Cater, C. M., and Mattil, K. F., Food Technol., 24, 242 (1970); Sosulski, F. W., Mc Cleary, C. M. and Soliman, F. S., J. Food Sci., 37, 253 (1972)].

Likewise compounds which are regarded as undesirable in the vegetable flours are the oligosaccharides of fermentable nature (raffinose, stachiose, verbascose, etc.) which cause flatulence and thus can limit the use of flours and proteic concentrates in the products intended for human feeding.

This invention describes a method adapted efficiently to extract under non-denaturing conditions for the proteins, the phenolic pigments and the fermentable oligosaccharides which are present in the vegetables. The chemical method as suggested herein exploits the diffusion in a polar solvent of substances having a low molecular weight through the membranes of the cells and the subcellular organelles. The extraction process suggested by the invention directly provides a proteic concentrate having a high biological value, which is virtually deprived of undesirable compounds (chlorogenic acid, gossypol, raffinose, stachiose, etc.) and is adapted to the preparation of proteinic isolates having a high degree of purity, a color from white to cream white in the entire solubility fields of proteins.

The method in question provides for the use of an organic polar solvent constituted by an alcohol, a ketone or an ester and by an aqueous solution of an electrolyte having an acidic nature, selected from the organic or inorganic acids or the acidic salts thereof.

The electrolyte weakens the interactions between the proteins and the phenols whereas the weakly acidic environment as provided by the electrolyte, increases the solubility of the phenols. The extraction process is carried out at a temperature ranging from 4° C to the temperature at which denaturation of proteins begins, with a final ratio flour to solvent which varies from 1 to 5 to 1 to 240 and a pH of the solvent which ranges from 2.0 to 6.0.

Among the vegetable flours which contain phenols and fermentable oligosaccharide, sunflower seed flour, soya bean flour and cottonseed flour have been subjected to a treatment with an acidic solution in n-butanol.

SUNFLOWER SEED FLOUR

Chlorogenic acid (3:3'-caffeylquinic acid) is equivalent to about the 70% of the phenolic compounds of sunflower and is present in the several varieties of the seeds in concentrations which range from 1 to 7%. The remaining 30% is constituted by seven known phenolic acids (iso-chlorogenic acid, caffeic acid, p-cumaric acid, iso-ferulic acid, ferulic acid, sinapic acid, trans-cinnamic acid) and by a few still unidentified compounds, according to what has been disclosed by "Sabir, M. A., Sosulski, F. W. and Kernan, J. A., J. Agr. Food Chem., 22, 572, (1974)".

The use in human feeding of the proteinic isolates from sunflower seeds flours is drastically hindered by the presence of chlorogenic acid, which, in the slightly alkaline environment used for extracting the proteins, is oxidized to quinone and imparts both to the extracts and the proteinic isolates a color which, according to the pH, varies from green to brown.

SOYBEAN FLOUR

In soybean flour, the flatulence-causing antinutritional factors are the fermentable oligosaccharides raffinose and stachiose [Rackis, J. J. et al., J. Food Sci., 35, 634 (1970)], which are as an average the 40% of the water-soluble low molecular weight carbohydrates. These compunds occur also in proteinic concentrates, but not in the isolates, since they are removed during the protein-extraction process.

COTTONSEED FLOUR

The principal limitations to the use of cotton proteins as a food is due to the association of a toxic polyphenolic aldehyde, gossypol (1,1',6,6',7,7'-hexahydroxy-5,5'-biisopropyl-3,3'-dimethyl-2,2'-binaphthalene-8,8'-dicarboxyaldehyde), with the proteinic fraction. Of all the gossypol, a portion reacts with the cottonseed proteins and a portion is found free. The toxic effects of gossypol prevent the use of the cottonseed proteins in food products.

Several methods have been suggested for removing or deactivating gossypol (Vaccarino, C., J. Amer. Oil Chem. Soc., 38, 143 (1961); Damaty, S. M. and Hudson, B. J. F., J. Sci. Food Agric. 26, 109 (1975) and a few of these methods are efficient but they employ only low-gossypol cottonseed flours.

In order to explain in detail the method suggested by the present invention, reference will be made, in the following disclosure, to a few examples which refer to the extraction of chlorogenic acid and raffinose from sunflowerseed oil, of gossypol from cottonseed flour and of raffinose and stachiose from soybean flour.

MATERIALS

Chlorogenic and caffeic acids, in the pure state, were supplied by Fluka AG, Bucks SG. Sucrose, raffinose and stachiose, in the pure state, were supplied by Sigma Chem. Co., Pure hydrochloric acid was by Merck.

N-butyl alcohol and n-hexane were supplied by Carlo Erba as RPE (Reattivo Puro Erba-Erba pure reagent) as the solvents.

Gossypol-acetic acid was prepared in the laboratory by extraction from hulled cottonseed according to the method by King, W. H. and Thurber, F. H., J. Am. Oil Chem. Soc., 30, 70 (1953) and had a purity as high as 98%.

METHODS

Macro-Kjeldahl method was used for determining nitrogen and the value of proteinic nitrogen has been obtained by multiplying the total nitrogen by 6.25.

Moisture, lipids and raw fiber have been measured according to the standard procedures by A.O.A.C. (Association Official Analytical Chemists, 12th Edition (1975).

Dosage of chlorogenic acid as regards Example 1 only has been carried out according to the A.O.A.C. method 14.025, 11th Edition, (1970).

Chlorogenic acid, caffeic acid, sucrose and raffinose have been determined in Examples 2 and 3 with gas chromatographic methods as silylated derivatives [Sabir, M. A., Sosulski, F. W., and Kernan, J. A., J. Agr. Food Chem., 22, 572 (1974)], while sucrose, raffinose and stachiose have been determined in the same way in Example 5. The analysis of free and total gossypol has been carried out according to the standard methods by A.O.C.S. [Official and Tentative Methods of the American Oil Chemists' Society, 3rd Edition, (1972)] Ba 8-58 and Ba 8-55, respectively.

GASCHROMATOGRAPHIC TECHNIQUES (glc)

Preparation of samples —Phenolic compounds and oligosaccharides as present in the defatted flour and the proteinic concentrate are extracted with 80% aqueous methanol in the ratio 1 to 100 flour/solvent by 5-hour refluxing [Mikolajczak, K. L., Smith, Jr, C. R., and Wolff, I. A. (1970) J. Agr. Food Chem. 18, 27]. The methanolic extract is evaporated to dryness in a vacuo at 40° C. The dry residue is solubilized with HCl at pH 2.0 and the resultant solution is adjusted to a pH of 6.0 by addition of diluted NaOH. The solution is evaporated to dryness in a vacuo at 40° C. The phenolic compounds and oligosaccharides are extracted at room temperature with anhydrous methanol in a measured quantity; the suspension is centrifuged and a fraction of the supernatant liquor is evaporated to dryness in a nitrogen stream at room temperature in reaction vials and the residue is silylated with a known quantity of TRI-SIL 'Z' by incubating at 60° C during 2 hours. TRI-SIL is N-trimethylsilylimidazole by Pierce Chemical Co.

Gaschromatographic Conditions

The glc analysis has been carried out by using a HP 7620 A gaschromatograph equipped with an automatic integrator HP 3380 A. The experimental conditions were as follows:

| | |
|---|---|
| Glass column | ⅛ in, by 6 feet |
| Stationary phase | OV-1, 3%, on Chromosorb WHP 80/100 mesh |
| Injector temperature | 300° C |
| Detector temperature | 300° C |
| Column | 150° C for 4 mins., 150° C–260° C at 6° C per minute 260° C during 30 minutes |
| Carrier gas | helium |
| Rate of flow | 35 mls/minute |
| Detector | flame ionization |

In the case of soybean flours, the analyses of oligosaccharides have been carried out with the following changes:

| | |
|---|---|
| column temperature | 150° C for 4 minutes, 150° C–250° C at 6° C/min. 250° C for 10 mins., 250° C–320° C at 15° C/minute 320° C–340° C at 10° C/minute, 340° C for 30 min. |
| injector temperature | 350° C |
| detector temperature | 350° C |

The o-biphenols and the oligosaccharides of the extracts have been identified on the basis of the retention times of the corresponding pure compounds. The quantitative analysis of the several peaks has been carried out with the automatic integrator. Known amounts of chlorogenic acid, caffeic acid, sucrose, raffinose and stachiose added to the extracts have been recovered with quantitative yields.

ELECTROPHORESIS

Electrophoretic analysis on 7.5% polyacrylamide gel has been carried out in a vertical apparatus by Canalco Industrial Corporation, Rockville, Maryland, by utilizing tris-glycine at a pH of 9.5 as the buffer [Davis, B., (1964) Ann. N.Y. Acad. Sci., 121, 404].

PREPARATION OF THE VEGETABLE FLOURS

The flours to be subjected to the extraction of phenols and oligosaccharides were prepared in the following way: sunflower seeds, cottonseed and soybeans, entirely hulled, were ground at +4° C in an OMNI-MIXER homogeneizer by Sörvall in the presence of n-hexane in the ratio of 1 to 2 of seeds to solvent. The flours were then defatted with n-hexane in the weight to volume ratio of 1 to 10 with stirring during 16 hours at 25° C. The solvent was stripped by filtration under vacuum with a filter pump on a porcelain Buchner funnel by using Whatman No. 4 filter paper. The flours were dried in a nitrogen stream during 1 hour at 25° C and ground with a Bühler apparatus to the grade No. 2. The chemical composition of the dry product was determined with the standard methods for moisture, proteins, lipids and raw fiber: the contents of phenols and oligosaccharides in sunflowerseed flour and soyflour were determined according to gaschromatographic methods.

EXTRACTION OF CHLOROGENIC ACID FROM SUNFLOWERSEED FLOUR (EXAMPLE 1)

The preparation of the solvent utilized in Example 1 for the extraction of chlorogenic acid from sunflowerseed flour has been carried out as follows:

One liter of n-butyl alcohol is mixed with one liter of an aqueous solution hydrochloric acid, $0.5 \times 10^{-2}$ N, at a pH of 2.48, the liquor being stirred occasionally and allowed to stand overnight in a separatory funnel. The top phase, which is collected after having discharged the aqueous acidic phase, is the solvent to be used for the extraction procedures concerned.

The sunflowerseed flour as prepared in the way described above is screened by using a Fritsch Analysette 3, screening machine to a grit size of 0.050 millimeters and admixed with the solvent in a weight to volume ratio of 1/30 during 30 minutes at 30° C with stirring.

The suspension is centrifuged at 5,000 rpm with a Sörvall RB-2 centrifuge, rotor SS-34, at room temperature during 10 minutes.

After having decanted the supernatant liquor, the extraction is repeated with the solvent many consecutive times (from 5 to 10 extractions) in the manner described above. The trend of the extraction run is followed by measuring every butanolic extract at 328 nm, that is at the maximum of absorption of chlorogenic acid dissolved in the solvent. The absorption coefficient $$\left(A \frac{1\ mg/ml}{1\ cm}\right)$$

of chlorogenic acid at that wavelength is 51.3. On completion of the extractions with the solvent the solid phase is dried in a nitrogen stream for 3 hours and the residual contents of chlorogenic acid is determined on this material with the A.O.A.C. 14.025 method.

EXTRACTION OF PHENOLS AND OLIGOSACCHARIDES FROM SUNFLOWERSEED FLOUR, COTTONSEED FLOUR AND SOYBEAN FLOUR (EXAMPLES 2, 3, 4 and 5)

The preparation of the solvent for the extraction of phenols and oligosaccharides from flours of sunflowerseed, cottonseed and soybeans has been carried out as follows: 92 parts of n-butyl alcohol are admixed with 8 parts of an aqueous solution of hydrochloric acid at a pH of 2.30. In these ratios the organic solvent is thoroughly miscible with the aqueous phase. The resultant solvent is added to the flour to be extracted in different ratios of flour to solvent with stirring during 15 minutes at different temperatures. The pH of the suspension is maintained constant in the interval of minimum solubility of the proteins contained in the flour which is being examined. The constancy of the pH is obtained by addition of half-normal hydrochloric acid to the suspension being stirred or also by adding a pH 0.5 solution formed by 92 parts of n-butyl alcohol and 8 parts of aqueous solution of hydrochloric acid. The suspension is filtered on Whatman No. 3 filter paper and the extraction is repeated (from 2 to 8 times) on the residue in the manner described hereinabove. On completion of the extractions the proteinic concentrate thus obtained is dried in a nitrogen stream during at least 3 hours. On different portions of dry material the chemical composition is determined as related to moisture, proteins, lipids and raw fiber. On such concentrate the residual contents of chlorogenic acid, caffeic acid, gossypol, sucrose, raffinose and stachiose are determined.

PREPARATION OF PROTEINIC ISOLATES

The proteinic concentrates as obtained with the procedure described above have been subjected to two different protein extraction processes: a single-step, nonselective extraction method, in an alkaline medium, and a second two-step method which operates a fractionation between the low-molecular-weight water soluble proteins having a high electrophoretic mobility, and the proteins which are soluble in an alkaline medium and having a high molecular weight with a low electrophoretic mobility. The second method gives two isolates with different compositions and properties.

SINGLE-STEP EXTRACTION

A portion of the proteinic concentrate coming from the extraction process is slurried in 15 parts of water, the pH is adjusted to 9.5 with 0.2N NaOH (flour/solvent ratio 1/15 weight to volume) and stirred during 30 minutes at 25° C.

The slurry is centrifuged at 17,000 rpm during 20 minutes with a Sörvall RB-2 centrifuge with an SS-34 rotor. A second extraction under the same conditions is repeated on the residue. The two supernatant liquors are combined and the proteins precipitated with 0.5N HCl to the isoelectric point. The precipitate is sedimentated by centrifugation at 17,000 rpm during 10 minutes and then washed with an acidic aqueous solution. The proteinic precipitate is taken up with an aqueous medium, neutralized to a pH of 7.0 and freeze-dried.

The dosage of the total nitrogen with the Kjeldahl method has been carried out on the precipitate, the supernatant liquor and the insoluble residue.

TWO-STEP EXTRACTION (I) A portion of proteinic concentrate has been treated with 15 parts of water at a pH of 6.5 (flour to solvent, weight to volume ratio 1/15) during 30 minutes with stirring at 25° C. The suspension is centrifuged at 17,000 rpm during 20 minutes and a second extraction under the same conditions is effected of the residue. On the two combined supernatant liquors precipitation of the proteins to the isoelectric point is carried out. The precipitate is washed with an acidic solution, slurried in water again, neutralized to a pH of 7.0 and freeze dried.

(II) On the insoluble residue coming from the first extraction step a solubilization of the proteins in an alkaline medium at a pH of 9.5 is carried out under the same conditions as reported for the single-step extraction procedure.

Further details will be emphasized in the Examples to be reported for a better understanding of the invention, which, however, should not be intended as a limitation of the invention.

EXAMPLE 1 — Extraction of Chlorogenic Acid from Sunflowerseed of the Amiata (Jenisei) Variety Chemical composition of the seeds:

| | |
|---|---|
| Moisture | 3.8% |
| On the dry matter : | |
| Proteins (N.6.25) | 24.9% |
| Lipids | 58.7% |

-continued

| | |
|---|---|
| Chlorogenic acid | 1.9% |
| Crude Fiber | 2.4% |
| Non-nitrogeneous extract substances | 8.7% |
| Ash | 3.4% |

Sunflowerseed flour as prepared in the way described above has the following composition:

| | |
|---|---|
| Moisture | 8.8% |
| On the dry matter : | |
| Proteins (N.6.25) | 64.6% |
| Lipids less than | 1.0% |
| Chlorogenic acid | 4.8% |
| Crude Fiber | 3.9% |

10 Grams of flour having a grit size of 0.050 millimeters are mixed in a flask with 300 mls of solvent during 30 minutes at 30° C with stirring. The mixture is centrifuged at 5,000 rpm during 10 minutes at room temperature, decanted and the extraction is repeated with 300 additional mls of fresh solvent. This treatment is carried out consecutively for a total of eight times (final ratio flour to solvent 1/240).

The chlorogenic acid contents of each extract is determined with spectrophotometric methods at 328 nm against a solvent blank, as tabulated in TABLE I.

TABLE I

| Number of extractions | Extracted chlorogenic acid milligrams per 10 grams flour |
|---|---|
| 1 | 203.5 |
| 2 | 99.2 |
| 3 | 53.8 |
| 4 | 31.0 |
| 5 | 19.3 |
| 6 | 7.8 |
| 7 | 6.2 |
| 8 | 4.3 |

On the residue of the eight extractions, dried in a nitrogen stream during 3 hours, chlorogenic acid is determined according to the A.O.A.C. 14.025 method.

After eights extraction the contents of chlorogenic acid is less than 0.2%.

EXAMPLE 2 — Preparation of Proteinic Concentrates and Isolates from Sunflowerseed of the Amiata (Jenisei) Variety Deprived of Chromogenic Compounds and Fermentable Oligosaccharides (a) Preparation of Proteinic Concentrates Exempt from O-biphenols and Oligosaccharides The used flour had the following composition:

| | | |
|---|---|---|
| Moisture | | 10.6% |
| On the dry matter : | | |
| Proteins (N.6.25) | | 58.7% |
| Lipids | less than | 1.0% |
| Chlorogenic acid | | 1.56% |
| Caffeic acid | | 0.14% |
| Sucrose | | 4.70% |
| Raffinose | | 3.32% |
| Crude fiber | | 4.2% |

20 Grams of defatted sunflowerseed flour are mixed in a flask with 400 mls of solvent formed by 92 parts of n-butyl alcohol and 8 parts of an aqueous solution of hydrochloric acid. The extraction proceeds during 15 minutes at 25° C with stirring. The initial pH of the suspension has a value of 6.2: during the extraction it is adjusted to 5.0 and maintained at that value by small increments of 0.5 N hydrochloric acid. The suspension is filtered on a Büchner funnel under vacuum, using Whatman No. 3 filter paper and repeated extractions are carried out on the solid residue, up to a total of eight extractions (final flour to solvent ratio 1/160).

The resultant product dried in a nitrogen stream during 3 hours has the following composition:

| | | |
|---|---|---|
| Moisture | 12.2% | |
| On the dry matter: | | |
| Proteins (N.6.25) | 72.9% | |
| Chlorogenic acid | less than 0.05% | Values lower than the limits of sensitivity of the used methods |
| Caffeic acid | less than 0.05% | |
| Sucrose | less than 0.01% | |
| Raffinose | less than 0.05% | |
| Crude fiber | 4.8% | |

This product, due to its proteinic contents (72.9%) is defined as a proteinic concentrate: it is virtually exempt from oligosaccharides and the phenolic constituents which are responsible for the green color which is formed during the extraction of proteins in an alkaline medium. The electrophoretic analysis on a polyacrylamide gel of the proteins extracted from the concentrate shows that they have the same electrophoretic pattern of those isolated from sunflowerseed flour.

(b) Preparation of Proteinic Isolates by Extraction in a Single Step

10 Grams of proteinic concentrate are slurried in 150 mls of an aqueous alkaline solution at a pH of 9.5 (flour to solvent ratio 1/15, weight to volume) during 30 minutes with stirring at 25° C. The pH of the suspension is maintained constant at a value of 9.5 during the entire extraction time by adding small increments of a diluted NaOH solution. The suspension is centrifuged at 17,000 rpm during 20 minutes and the residue is subjected to extraction again under the conditions reported above. The two proteinic solutions are combined and precipitated with 0.5N HCl at a pH of 5.2. The precipitate is separated by centrifuging at 17,000 rpm during 10 minutes, washed with acidic water of a pH of 5.2, slurried in water again, neutralized at a pH of 7.0 and then freeze-dried. The proteinic contents relative to the isolate, supernatant and insoluble residue of the method of extraction in a single step are reported in TABLE II.

The color of the isolate is light cream white.

(c) Preparation of Proteinic Isolates by Two-Step Extraction (I) 10 Grams of proteinic concentrate are added to 150 mls of an aqueous solution of a pH of 6.5 (flour to solvent, weight to volume ratio 1/15) during 30 minutes with stirring at 25° C. The pH of the suspension is kept constant at 6.5 by adding small increments of a 0.02 N NaOH solution. The suspension is centrifuged at 17,000 rpm during 20 minutes and the residue is subjected to extraction again under the same conditions. The two combined proteinic solutions are precipitated with 0.5N HCl at a pH of 4.0. The precipitate is separated by centrifugation at 17,000 rpm during 10 minutes, washed with acidified water of a pH of 4.0, slurried in water again, neutralized at a pH of 7.0 and eventually freeze-dried.

The I isolate has a white color.

(II) On the insoluble residue coming from the preceding procedure an extraction of the proteins is effected in an alkaline medium at a pH of 9.5 under the same conditions as described in the single-step protein extraction method.

The proteinic contents relative to the isolate, supernatant and insoluble residue of the two-step extraction procedure are tabulated in TABLE II.

The II isolate has a light cream white color.

butyl alcohol and 8 parts of an aqueous solution of HCl. The extraction proceeds during 15 minutes at 25° C with stirring. The initial pH of the suspension has a value of 6.1. During the extraction it is kept constant at a value of 4.0 by incremental additions of 0.5N HCl. The suspension is filtered under vacuum on a Büchner

TABLE II

Preparation of proteinic isolates with the single-step and the two-step method from a sunflowerseed concentrate exempt from o-biphenols and fermentable oligosaccharides

| CONCENTRATE | | | ISOLATE | | | | SUPERNATANT | RESIDUE |
|---|---|---|---|---|---|---|---|---|
| % protein* | Extraction method | pH | pH | % protein yield | % protein* | color | % protein yield | % protein yield |
| 72.9 | Single-step (I) NaOH | 9.5 | 5.2 | 60.6 | 95.4 | light cream | 10.5 | 26.9 |
| 71.9 | Two-step (I) H$_2$O | 6.5 | 4.0 | 5.6 | 83.3 | white | 5.0 | |
| | (II) NaOH | 9.5 | 5.2 | 57.1 | 98.8 | light cream | 4.1 | 26.3 |

*Total N × 6.25

EXAMPLE 3 — Optimization of the Extraction Process of o-biphenols and Fermentable Oligosaccharides from Sunflowerseed of the Amiata (Jenisei) Variety for the Preparation of Proteinic Concentrates The used sunflowerseed flour had the same composition as reported in Example 2.

20 Grams of deoiled flour are added in a flask to 100 mls of a solvent formed by 92 parts of n-butyl alcohol and 8 parts of an aqueous solution of HCl, the extraction being carried out during 15 minutes at 25° C with stirring. The initial pH of the suspension is 6.2 and during the extraction it is maintained constant at a value of 5.0 with small increments of 0.5 N HCl. The suspension is filtered under vacuum and eight extractions are carried out on the solid residue (final ratio flour to solvent 1/40). The resultant product as dried in a nitrogen stream during 3 hours has the following composition:

| Moisture | | 10.8% |
|---|---|---|
| On the dry matter : | | |
| Proteins (N.6.25) | | 69.0% |
| Chlorogenic acid | less than | 0.05% |
| Caffeic acid | less than | 0.05% |
| Sucrose | | 1.38% |
| Raffinose | | 1.33% |
| Crude fiber | | 4.6 % |

These results show that by passing from an extraction ratio flour to solvent 1/160 (Example 1) to 1/40, the residual contents of chlorogenic acid and caffeic acid remains unaltered (less than 0.05%) while the extractability of sucrose and raffinose is decreased.

EXAMPLE 4 — Preparation or Proteinic Concentrates Having a Low Gossypol Contents from Hulled Cottonseed The used cottonseed flour had the following composition:

| Moisture | | 10.0% |
|---|---|---|
| On the dry matter : | | |
| Proteins (N.6.25) | | 47.6% |
| Lipids | less than | 1.0% |
| Free gossypol | | 1.45% |
| Total gossypol | | 1.93% |
| Crude fiber | | 1.0 % |

20 Grams of defatted cottonseed flour are added in a flask to 400 mls of a solvent formed by 92 parts of n- funnel in Whatman No. 3 filter paper and on the solid residue eight extractions are carried out (final ratio flour to solvent 1/160) under the conditions as reported above. The resultant proteinic concentrate is dried in a nitrogen stream during 3 hours and has the following composition:

| Moisture | | 10.5% |
|---|---|---|
| On the dry matter : | | |
| Proteins (N.6.25 ) | | 66.5% |
| Lipids | less than | 0.5% |
| Free gossypol | | 0.07% |
| Total gossypol | | 0.34% |
| Crude fiber | | 2.7 % |

The treatment with n-butyl alcohol and aqueous HCl solution has given a proteinic concentrate (66.5% of proteins) under non-denaturating conditions with low residual contents of free and total gossypol. The method suggested by the invention has the advantage that also cottonseed flour having a high gossypol contents can be used, which are at present unsuitable for the preparation of proteinic concentrates and isolates.

EXAMPLE 5 — Preparation of Proteinic Concentrates Having a Low Contents of Fermentable Oligosaccharides from Hulled Soybeans of the Ada Variety Chemical composition of the flour:

| Moisture | | 11.2% |
|---|---|---|
| On the dry matter : | | |
| Proteins (N.6.25) | | 53.8% |
| Lipids | less than | 1.0% |
| Sucrose | | 8.24% |
| Raffinose | | 0.94% |
| Stachiose | | 4.70% |
| Crude fiber | | 1.30% |

20 Grams of deoiled soy flour are added in a flask to 400 mls of a solvent formed by 92 parts of n-butyl alcohol and 8 parts of an aqueous solution of HCl, the extraction being carried out during 15 minutes at 40° C with stirring. The initial pH of the suspension has a value of 6.3 and during the extraction is brought to and maintained at a value of 4.5 by small incremental additions of 0.5N HCl.

The suspension is filtered under vacuum on a Büchner funnel using Whatman No. 3 filter paper and on the solid residue repeated extractions up to a number of eight are carried out (final flour to solvent ratio 1/160).

The resultant product as dried in a nitrogen stream during 3 hours has the following composition:

| | |
|---|---|
| Moisture | 9.3% |
| On the dry matter : | |
| Proteins (N.6.25) | 65.9% |
| Sucrose | 0.41% |
| Raffinose | 0.83% |
| Stachiose | 2.82% |
| Crude fiber | 2.4 % |

This product on account of its proteinic contents (65.9%) is defined a proteinic concentrate and has a low contents of fermentable oligosaccharides.

What we claim is:

1. A method for the extraction of phenols and oligosaccharides from vegetable protein materials containing said phenols and oligosaccharides consisting in extracting said protein materials selected from the group consisting of flours, concentrates and isolates with an extracting amount of a polar solvent consisting of n-butyl alcohol in miscible combination with an aqueous solution of an electrolyte having an acidic nature selected from the group consisting of organic or inorganic acids and the acidic salts thereof.

2. A method for the extraction of phenols and oligosaccharides according to claim 1 characterized in that the extraction is carried out with a total protein material to solvent ratio ranging from 1:5 to 1:240.

3. A method for extracting phenols and oligosaccharides according to claim 1 characterized in that the pH of the aqueous solution of the electrolyte ranges from 2.0 to 6.0.

4. A method for extracting phenols and oligosaccharides according to claim 1 characterized in that the extraction is carried out at temperatures in the range from 4° C to the temperature at which the denaturation of the proteins begins.

5. A method for the extraction of phenols and oligosaccharides according to claim 1 characterized in that the electrolyte is an inorganic acid.

6. A method for the extraction of phenols and oligosaccharides according to claim 5 characterized in that the acid is hydrochloric acid.

7. A method for the extraction of phenols and oligosaccharides according to claim 1 characterized in that the extraction is carried out on a substrate selected from the group consisting of sunflowerseed flour, cottonseed flour and soybeanflour.

8. A method for the extraction of phenols and oligosaccharides from a substrate selected from the group consisting of soy flour, sunflower seed flour and cottonseed flour which comprises contacting said substrate with an extracting amount of a miscible mixture of n-butanol, water and hydrochloric acid to extract said phenols and oligosaccharides.

9. The method of claim 8 wherein the flour to solvent ratio is from 1:5 to 1:240.

10. The method of claim 8 wherein the pH of the water-hydrochloric acid mixture ranges from 2.0 to 6.0.

* * * * *